United States Patent Office 2,783,235
Patented Feb. 26, 1957

2,783,235

PROCESS FOR TROPANE DERIVATIVES

Christoph J. Grundmann and Gerhard Ottmann, Columbus, Ohio, assignors to Olin Mathieson Chemical Corporation, a corporation of Virginia No Drawing. Application July 26, 1955,
Serial No. 524,590

7 Claims. (Cl. 260—292)

The present invention relates to an improved synthesis for derivatives of tropane, the parent substance of the tropa-alkaloids, e. g. cocaine, atropine, etc.

The synthesis comprises the reaction of a cycloheptatriene-carboxylic acid and a primary amine represented by the formula R—$NH_2$. All four isomers of cycloheptatriene-carboxylic acid known as $\alpha$-, $\beta$-, $\gamma$, and $\delta$-cycloheptatriene-carboxylic acid are suitable for use in the synthesis of the present invention although the use of the $\alpha$- and $\beta$-acids are preferred as they are more easily prepared and give the highest yields of the desired tropane derivatives. In place of the free acids other equivalent compounds such as the alkali metal salts, the lower alkyl esters, amides or other inorganic and organic derivatives of the cycloheptatriene acids can also be employed. The amine compound is characterized by a primary amino group $H_2N$—R, in which R represents hydrogen, lower alkyl groups such as methyl, ethyl, propyl, butyl, isoamyl, and hexyl including lower cycloalkyl groups such as cyclopentyl and cyclohexyl, aralkyl groups such as benzyl, heterocyclic groups such as pyridine, thiazole and pyrimidine, and NR'R' where R' represents hydrogen and the alkyl groups noted above, etc. For example, where R is hydrogen the reaction is carried out with ammonia, where R is alkyl with methylamine, ethylamine, isopropylamine, secondary butylamine n-amylamine, cyclohexylamine, etc., where R is aralkyl with benzylamine, where R is a heterocyclic group with aminopyridine, aminothiazole and aminopyrimidine, and where R is NR'R' with hydrazine and substituted hydrazines such as dimethyl hydrazine, phenylhydrazine, etc. In the reaction which can be carried out in water, e. g. with the free acids or water soluble salts, or in a suitable organic solvent like methanol, ethanol and dioxane, or excess primary amine where the amine acts as a solvent, the amine adds to two of the three double bonds present in cycloheptatriene-carboxylic acid to form the bicyclic tropane ring system. The third double bond remains but may shift to another position during the reaction as shown below.

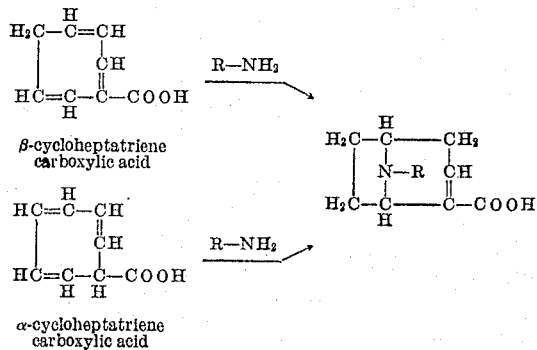

$\beta$-cycloheptatriene carboxylic acid $\alpha$-cycloheptatriene carboxylic acid The carboxylic group does not enter into the reaction and, as stated above, the present invention includes the use of salts such as the sodium salt, esters such as the ethyl ester, the amide, etc. along with other equivalent carboxy derivatives as well as the free acid. The amine can also be introduced into the reaction mixture as the hydrohalide, e. g. HCl salt, where, in the presence of excess alkali, e. g. NaOH, the free amine is formed in situ. The reaction between the primary amine and cycloheptatriene-carboxylic acid proceeds at a reasonable rate above 80° C. with reaction temperatures of about 100–150° C. being generally preferred. The following examples will serve to illustrate the invention.

*Example I*

To a solution of 40 g. of $\beta$-cycloheptatriene-carboxylic acid and 12 g. of sodium hydroxide in 150 ml. of water a solution of 80 g. of methylamine hydrochloride and 48 g. of sodium hydroxide in 600 ml. of water is added and heated to 150° C. for 6 hours in a 2 l. shaking autoclave (stainless steel). Water and excess methylamine are distilled off in vacuo; the nearly dry residue dissolved in 2N-sulfuric acid to pH 1–2 and the acid solution extracted with ether to remove unreacted material. The acid solution is then neutralized with 2 N-NaOH and evaporated in vacuo to dryness. The dry residue is extracted with 200 ml. of absolute alcohol and the crude anhydro-ecgonine precipitated from the resulting alcohol solution with dry ether (8 times of the amount of alcohol) and separated by filtration. This product in which R=$CH_3$ has a M. P. 235° C. (decomp.). It can be converted to cocaine and atropine by known syntheses.

To a solution of 28 g. of crude anhydro-ecgonine in 50 ml. of water a solution of 90 g. of hydrochloric acid in 100 ml. of water is added and the mixture evaporated on a steam bath. The crude anhydro-ecgonine hydrochloride obtained is a brown viscous syrup crystallizing after drying over solid potassium hydroxide.

A solution of 32 g. of crude anhydro-ecgonine hydrochloride and 10 g. of sulfuric acid (98%) in 96 g. of absolute alcohol is refluxed for 24 hours. The alcohol is distilled off, the residue dissolved in 50 ml. of water and carefully super-saturated with solid potassium carbonate. The anhydro-ecgonine ethylester is extracted from the resulting reaction mixture with ether. After distilling off of the ether, the ester is obtained by vacuum distillation with a B. P. 69–70° C./0.37 mm. Hg; $n_D^{23.2°}$ 1.4948. Methoiodide: microscopic needles from ethanol, M. P. 170–170.5° C. Picrate: yellow microscopic needles from ethanol, M. P. 144–146° C.

*Example II*

To a solution of 18 g. of $\alpha$-cycloheptatriene-carboxylic acid and 5.3 g. of sodium hydroxide in 72 ml. of water a solution of 42 g. of methylamine in 360 ml. of water is added and heated in a shaking autoclave to 125° C. for 15 to 20 hours. Water and excess methylamine are distilled off in vacuo. The nearly dry residue is dissolved in 2N-sulfuric acid. By extraction with ether only a very small amount of acid is recovered unreacted. The acid solution is neutralized with 2 N-NaOH and evaporated in vacuo to dryness. To the dry mixture of the amino acid and inorganic salts 30 ml. of absolute ethyl alcohol and 22 g. (2 mol) of sulfuric acid (98%) are added and the alcoholic solution is refluxed for 24 hours. The alcohol is distilled off, the residue dissolved in a small amount of water and carefully supersaturated with solid potassium carbonate. The anhydro-ecgonine ethylester is extracted from the resulting reaction mixture with ether. After distilling off of the ether, the ester is obtained by vacuum distillation.

*Example III*

To a solution of 30 g. of crude ethyl ester of $\beta$-cycloheptatriene-carboxylic acid and 8 g. of sodium hydroxide in 100 ml. of water a solution of 60 g. ammonia in 500 ml. of water is added and heated in a shaking autoclave to 125° C. for 20 hours. Water is then distilled off in vacuo. The nearly dry residue is dissolved in 2 N-sulfuric acid and extracted with ether. The acid solution is neutralized with 2 NaOH and evaporated in vacuo to dryness. To the dry mixture of the amino acid and inorganic salts 150 ml. of absolute ethyl alcohol and 6 ml. of sulfuric acid (98%) are added and the alcoholic solution is refluxed for 24 hours. The alcohol is distilled off, the residue dissolved in a small amount of water and carefully super-saturated with solid potassium carbonate. The noranhydro-ecgonine ethylester is obtained by extracting the aqueous solution 5–10 times with ether, and removal of the ether to yield a product with a B. P. 86° C./0.3–0.5 mm. Hg; $n_D^{21.5°}$ 1.5015.

Example IV

A solution of 30 g. of crude ethyl ester of β-cycloheptatriene-carboxylic acid and 8 g. of sodium hydroxide in 100 ml. of water is mixed with a solution of 45.7 g. hydrazine hydrate in 500 ml. of water and heated in a shaking autoclave for 20 hours to 125° C. The nearly colorless solution is evaporated in vacuo to dryness. The residue is dissolved in 2 N-sulfuric acid and the undissolved product is removed by filtration. Both solution and solid material are extracted separately with ether in order to remove the unreacted β-cycloheptatriene-carboxylic acid. The acid solution is neutralized with 2 N-NaOH and evaporated in vacuo to dryness. The residue is converted into the ethylester according to the methods described above to yield N-amino-noranhydro-ecgonine ethylester as a colorless, viscous oil, B. P. 111–115° C./0.4 mm. Hg; $n_D^{22.4°}$ 1.5058.

Example V

To a solution of 15 g. of γ-cycloheptatriene carboxylic acid and 4.5 g. of sodium hydroxide in 60 ml. of water a solution of 54 g. of methylamine in 300 ml. of water is added and heated in a 2 l. shaking autoclave to 120° C. for 20 hours. Water and excess methylamine are distilled off in vacuo. The residue is dissolved in 2 N-sulfuric acid and the insoluble resinous material separated by filtration. After extraction with ether to remove the acids the water solution is neutralized with 2 N-NaOH under cooling and evaporated in vacuo to dryness. The mixture of the amino acid and inorganic salts is dried over $P_2O_5$, dissolved in 250 ml. of absolute ethyl alcohol and refluxed in presence of 19 g. of sulfuric acid for 24 hours. The alcohol is distilled off, the residue is dissolved in a small amount of water and careful supersaturated with solid potassium carbonate. After extraction and distilling off of the ether, a crude product, B. P. 77–85° C./0.4–0.5 mm. was obtained. Subsequent fractional vacuum distillation lead after separation of a small forerun to the isolation of anhydro-ecgonine-ethylester, B. P. 82–84°/0.6 mm., $n_D^{25°}$ 1.4935.

In a similar manner other amines (where R represents the groups indicated above) can be reacted with cycloheptatriene-carboxylic acid (or carboxy derivatives of the same) to produce various N-substituted bicyclic compounds. These compounds can be converted by known means to alkaloids such as cocaine, atropine and the like and various N-substituted derivatives of the same. The compounds containing a carboxyl group can also be reacted with aliphatic, cycloaliphatic, aralkyl and aryl metallo-organic compounds as illustrated by the reaction of anhydroecgonine with lithiumphenyl to produce diphenyltropenyl-carbinol. The preparation of these latter type compounds which have atropine activity are described in our co-pending application, Serial No. 524,589, filed July 26, 1955. The process of the present invention thus provides ready means for preparing intermediates of use in the pharmaceutical field.

We claim:

1. The process of converting cycloheptatriene-carboxylic acid to a compound having the bicyclic tropane ring system characterized by the presence of one double bond and a carboxyl group which comprises reacting cycloheptatriene-carboxylic acid with a primary amine at a temperature of at least about 80° C.

2. The process which comprises reacting a primary lower alkyl amine with cycloheptatriene-carboxylic acid at a temperature of at least about 80° C.

3. The process of preparing anhydro-ecgonine which comprises reacting cycloheptatriene-carboxylic acid with methyl amine at a temperature of about 100–150° C.

4. The process of preparing anhydro-ecgonine which comprises heating β-cycloheptatriene-carboxylic acid with methylamine at a temperature of about 100–150° C.

5. The process of preparing anhydro-ecgonine which comprises heating α-cycloheptatriene-carboxylic acid with methylamine at a temperature of about 100–150° C.

6. The process of preparing noranhydro-ecgonine which comprises heating cycloheptatriene-carboxylic acid with ammonia at a temperature of about 100–150° C.

7. The process of preparing N-amino-noranhydro-ecgonine which comprises heating cycloheptatriene-carboxylic acid with hydrazine at a temperature of about 100–150° C.

No references cited.